Oct. 10, 1950     R. TWELLS     2,525,324
METHOD OF PRODUCING CERAMIC GAUGES
Original Filed Nov. 26, 1943
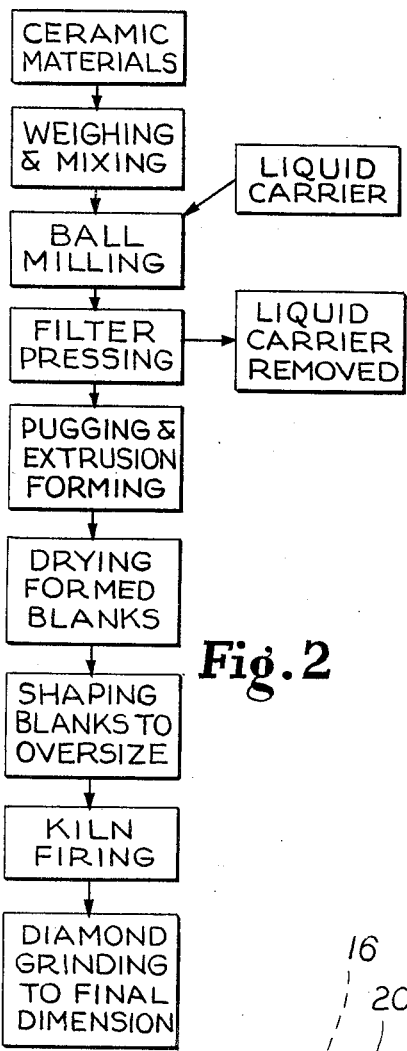
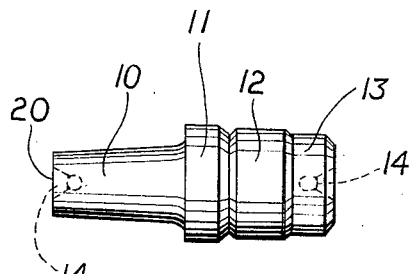
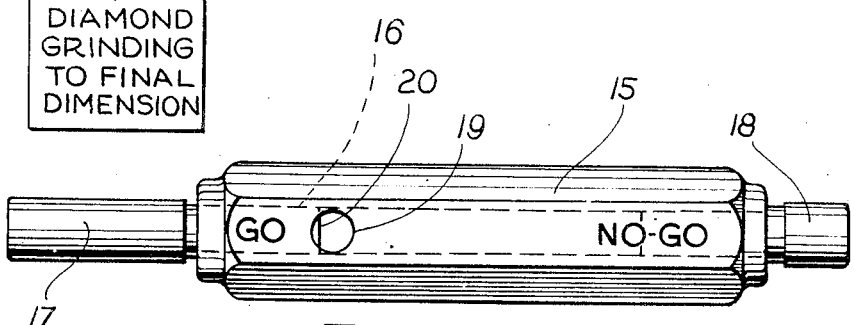
INVENTOR
ROBERT TWELLS
BY
Falvey, Souther & Stoltenberg
ATTORNEYS Patented Oct. 10, 1950

2,525,324

UNITED STATES PATENT OFFICE 2,525,324

METHOD OF PRODUCING CERAMIC GAUGES

Robert Twells, Fostoria, Ohio

Original application November 26, 1943, Serial No. 511,768. Divided and this application November 27, 1945, Serial No. 631,118

5 Claims. (Cl. 25—156)

This invention relates to gauges made of artificially bonded ceramic materials and more particularly to the method of making the same. This application is a division of my co-pending application for United States Letters Patent, filed November 26, 1943, Serial No. 511,768, which issued into Patent No. 2,495,789 on January 31, 1950.

The gauges in the prior art have long been made from tool steel or the like which has been heat-treated to obtain maximum hardness, but these gauges suffer the disadvantage of being unduly subject to wear by abrasion by the objects whose dimensions are being tested. This wear materially changes the dimensions of the gauge within a relatively short period of use so that its size falls outside of the narrow limits of variation allowed in dimensions of gauges. After the worn gauge had changed its dimension to fall outside of the allowed tolerance, the gauge was often repaired by coating the tool steel with a hard abrasive-resistant material, such as chromium, preferably by a plating process, which allowed the further continued use of the gauge for a considerable length of time. However, the durability or wearing characteristics of such gauges in use, either plated or unplated, still left much to be desired.

Glass has also been used in gauges, but the brittleness of the material caused frequent breakage and chipping so as to destroy the usefulness of the gauge. It also has been suggested to use hard refractory bodies which are found in nature, such as feldspar, quartz, zircon, beryl, topaz and others from which the gauges were laboriously formed by cutting away a body of the material to the desired conformation of the gauge having the required dimensions. These applications, however, have not found wide application in industry.

The present invention provides a gauge which is made of tough, exceedingly hard material which is wear-resistant and will allow a number of "passes" in use which is many times greater than the gauges presently available. This is not only an advantage from the production angle, in that the required dimensions of the measured objects are more closely maintained, but also it is cheaper from the cost angle inasmuch as replacement is not necessary as frequently as with gauges presently in use. The gauge contemplated is given its general form in its prefired, unvitrified condition when the material is easily cut and formed, and given its final cutting to exact dimensions after firing when it is in vitrified condition while the material is tough and exceedingly hard. When the gauge is given its general form with the material thereof in unfired condition, an allowance must be made for shrinkage taking place during firing which is preferably carefully predetermined so that the dimensions of the fired body of the gauge closely approaches its final dimension with a small oversize to allow some leeway for a final grinding operation cutting the gauge to exact size. Yet the oversize must be relatively small to reduce final grinding to a minimum to obviate the necessity of removing large amounts of the exceedingly hard vitrified material formed by the burning or firing.

It is, therefore, a principal object of this invention to provide a gauge made of artificially-bonded ceramic material which has great hardness and durability.

It is a further object of this invention to provide a gauge which consists largely of non-plastic metallic oxides, of the type which when mixed with a liquid carrier are not auto-cementitive to produce a body of suitable plasticity to be extruded or capable of retaining predetermined configurations, artificially-bonded together by a small percentage of ceramic flux.

It is a further object of this invention to provide a method of making gauges wherein non-plastic metallic oxides are artificially-bonded together by a small percentage of ceramic flux which will result in a gauge having a body which is extremely hard and tough so as to be wear-resistant and durable.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

In the drawings:

Fig. 1 is an elevational view of a plug gauge provided with guide surfaces made in accordance with this invention.

Fig. 2 is a diagrammatic scheme, showing the different steps in the method of making ceramic gauges.

Fig. 3 shows a plug type gauge as inserted in a handle ready for use.

Referring to Fig. 1, a plug type gauge is shown having a tang 10 of tapering contour adapted to attach the gauge to a holder or handle as will be discussed hereinafter. Forward of the tank 10 a head 11 is provided which is substantially larger than the tang and forms a stop for a gauge surface 12 positioned forwardly of the head 11. A guide surface 13 is positioned forwardly of the gauging surface 12 and serves to align the gauge surface with the aperture whose dimension is to be measured so as to prevent chipping by impact of the gauge surface with the perimeter of the aperture. The guide surface 13 also prevents the gauge from joggling in the aperture which would tend to cramp the gauge therein so as to cause undue wear on the gauge surface, the guide surface tends to maintain alignment between the gauge and the aperture. Centering apertures 14 are provided in each end of the plug gauge, being formed therein during the prefired forming stage of the gauge in the process of mak'ng the same as will be described further hereinafter.

The use to which a gauge of this type is put makes it highly advantageous that the body thereof shall be made of a material which has maximum hardness so as to prevent wear when it is being used in gauging operations and also that it shall be tough as contradistinguished from brittle to prevent chipping under the impact of blows such as might arise in careless handling of the gauge or dropping thereof on a hard-surfaced floor. This invention provides a gauge which fulfills these desirable characteristics and at the same time has the added advantage that during a stage in the fabrication of the gauge this hard tough material is relatively soft and easily formed by working to a desired contour to reduce the cost of making the gauge to a feasible figure. The process of making a typical gauge will now be described in detail.

The basic material of which the gauge is made consists primarily of a metallic oxide, or a mixture of several oxides having, in general, very high temperatures of fusion, such as for example, aluminum oxide which is the preferred material. As is well known, aluminum oxide is non-plastic and taken alone is not readily formed into cohesive bodies which may be shaped into the desired contour of the gauge to allow firing. Furthermore, aluminum oxide taken alone, has such an extremely high temperature of fusion that it is impracticable to make the gauge by the process of fusing it into a homogeneous body. Sintering aluminum oxide into a cohesive body requires a much lower temperature than to completely fuse the same, but still requires a temperature which is too high for convenient commercial utilization. It has been found that when ceramic fluxes are added to the aluminum oxide to form a cementing substance to fill the interstices between the particles or granules of aluminum oxide to form a homogeneous body, the resulting body partakes largely of the physical characteristics of the aluminum oxide, such as for example great hardness, and also sufficient toughness to be infrangible.

The adding of the ceramic fluxes, such as for example oxides of the metals found in groups I, II and IV of the periodic table of elements, especially the alkaline earth group, has the further advantage of reducing the firing temperature at which vitrification of the ceramic body occurs. In these groups Na, K, Be, Mg, Ca, Ba, Si, Zr, and Ti, are the preferred oxides, the remaining oxides are usually very expensive or too rare for practical use. Mixtures of this type may vary widely in their constituents. For example, if aluminum oxide is to be the basic substance, its percentage of the whole may vary from 85% to substantially 100% pure aluminum oxide, while the remainder consists of the ceramic fluxes discussed hereinabove and/or mineral and organic plasticizers and binders. However, as the percentage of aluminum oxide increases, the vitrification temperature also increases so that there must be a balancing of factors to obtain the desired characteristics of hardness and toughness in the finished product as against the vitrification temperature used in the kiln in which the bodies of the gauges are fired. The characteristics of hardness and toughness of the aluminum oxide are not substantially decreased by the addiiton of ceramic fluxes up to 20% of the whole, however, there is a point reached at which the bodies formed by these admixtures are substantially influenced by the addition of the ceramic fluxes which, in general, do not contribute many desirable characteristics to the completed vitrified body. It is desirable to maintain the percentage of the fluxes as low as possible commensurate with the reduction of the vitrification temperature used during the firing stage.

For aid in forming, it is sometimes desirable to add a mineral binder which has a characteristic of plasticizing the admixture, such as clays of certain types, so that it is in a proper condition to form a cohesive body which is capable of being worked and handled in the various steps in the process of making the gauge body. The mineral binder usually acts also as a ceramic flux at the high firing temperatures used to vitrify these bodies. To avoid over-dilution of the properties of the pure oxides, organic binders may be added to give a cohesive quality to the elements of the admixture to hold the body temporarily together during the different steps in the process of manufacture. The organic binder will not affect the composition of the completed body of the gauge, being removed during the firing process thereof due to the fact that the temperature is sufficiently high to burn out completely the organic substances which are used to form the binder. No trace will be found of them in the completed body of the gauge as it is removed from the kiln.

Turning now to Figure 2 of the drawings, a diagrammatic scheme is illustrated showing the various steps taken in the fabrication of the gauge. Beginning with the raw material, which may be a non-plastic metallic oxide (or a combination of such oxides) such as aluminum oxide, and a ceramic flux which may include an oxide of alkaline earth metal, such as magnesium oxide, these materials are carefully weighed to obtain a proper proportion between the constituents of a batch. These raw materials may be calcined and finely divided or pulverized by grinding prior to their being mixed together, or, in the event that these materials are not sufficiently finely divided to serve, the mixture may be placed in a ball mill and provided with a liquid carrier to facilitate the further pulverization of these raw materials to the degree desired. When the grinding process in the mill is completed, the slip formed therein is withdrawn from the mill and placed in a storage tank. The liquid carrier, which may conveniently be water or any other substance which has the proper characteristics for use in the grinding mill, is partially removed, usually by filter pressing, and the cake so formed is placed in a pugging machine and again thoroughly mixed to form a uniform mixture of the constituents of the batch. After the pugging has served its purpose, the ceramic batch is extruded and formed into blanks having the size and shape to allow forming of a prefired gauge body.

These blanks are then allowed to dry to bone-dryness which removes a large percentage of the moisture and gives the blank a consistency similar to chalk, which is a suitable condition for shaping the blank into substantially the final conformation of the completed gauge, with an allowance, however, being made, firstly for the shrinkage which the gauge body undergoes during the vitrification thereof in a kiln, and secondly to obtain a margin of extra material on the vitrified body which may be removed in the final grinding of the gauge. These oversized unfired gauge bodies are then placed in a kiln and fired at a temperature preferably over 1600° centigrade until vitrification of the body takes place and an extremely hard, dense, tough gauge body is formed, slightly oversize to allow final grinding to size. The hardness of the vitrified body or gauge-measuring part is preferably of a hardness of over Moh's scale 8 and consists predominantly of exposed ground crystals or granules of non-plastic or metallic oxides.

Due to the fact that commercially obtainable ceramic materials vary widely in their purity and that slight changes in the percentages of the constitutents of such impurities affect changes in the characteristics of the mixture and thereby of the final ceramic gauge of the invention, certain characteristics of the final product cannot be forecast with absolute accuracy. However, the characteristic of hardness and toughness can be forecast with reasonable accuracy but shrinkage characteristics of the bodies having different constituents vary too widely to be forecast within the desired limits and must be determined by actual experimentation with the ceramic mixture to be used for the gauges. The shrinkage characteristics also vary due to different densities in the unfired blanks, which may arise from variations in moisture content, extruding pressures and the like. Once determined, these shrinkage characteristics are sufficiently constant, depending upon the uniformity of the percentage of the constituents and density, that the oversize of the unfired blanks to compensate for shrinkage may be held to limits whereby an oversize of 0.01 to 0.02 inch may be obtained in the fired blank to give a reasonable amount of extra material available for the final grinding step.

Thereafter the gauge is ground to final dimension, preferably by a diamond grinding process as is well known in the art. For this purpose the centers 14, as shown in the completed gauge in Fig. 1, may be used. These centers are first formed in the blank during the chalk stage of the ceramic material at which time they may be readily cut into the end faces of the blank and establish the center line of the gauge which remains so even after vitrification has taken place.

The gauge body is then mounted in a handle 15 (Fig. 3) having a central longitudinal aperture 16 provided with outwardly tapering portions adjacent the ends of the handle 15 which form seats for the tangs 10 of the gauge elements. Two of these gauge elements are used in connection with the handle 15, one element 17 being a "Go" gauge and a second element 18 being a "No-Go" gauge, each having a predetermined relative size. In order to remove the gauge elements 17 and 18 conveniently from the handle 15, a transverse aperture 19 is provided adjacent the end face 20 of the tang 10 of the gauge element 17 which facilitates the removal of the gauge element from the aperture 16. Thereafter the gauge element 18 is readily removed by inserting a member (not shown) into the aperture 16 to drive out the tang of the gauge portion 18.

In the above discussion it has been assumed that the ceramic fluxes or clay used in connection with the batch described have a plasticizing characteristic which would allow the formation of a cohesive body without the use of any temporary binder. However, if a batch does not have the plastic characteristic, an organic binder may be added to the batch to serve the purpose of temporarily holding the constituents of the batch together to form a cohesive body. Such an organic binder may be gum tragacanth, dextrine, resins, or any other substance well known in the art. This material may be added directly to the grinding mill with the liquid carrier, or it may be added at any other convenient stage during the process of making the gauge.

A specific example of a ceramic batch from which a gauge may be made is this preferred composition which consists of

| | Per cent |
|---|---|
| Alumina | 90 |
| Clay | 10 |
| | 100 |

The clay is mineral plasticizer in the formative stage of the gauge and is the flux which in part forms a glassy matrix holding the alumina artificially together after vitrification of the body during firing. The firing temperature of this composition is approximately 1680° C. The various compositions of batches contemplated by this invention have a firing temperature range from 1700° C. to 1500° C. The preferred fluxes are magnesium carbonate, calcium carbonate, barium carbonate, dolomite, talc or feldspar and/or all their combinations. Organic plasticizers and binders may be added up to 20% by weight to form a temporary addition for a binder.

The unfired body of the gauge, which is made oversize to allow for shrinkage and grinding after firing, may be made by other methods. For example, the slip which comes from the grinding mill may be used for casting into a porous mold to form the body of the gauge. This is accomplished by pouring the slip directly into the porous mold after its removal from the grinding mill, the mold being of such a nature that it absorbs from the slip the liquid carrier, leaving the fines cast into the form of the mold. Thereafter the casting with or without the surrounding mold is subjected to a drying atmosphere with or without the application of heat so as to remove a large percentage of the moisture from the mold and/or casting. The casting, which is chalky in nature, is then further shaped by grinding to its oversize conformation necessary prior to firing. The firing and final grinding processes thereafter are substantially the same as that described above.

Another method by which these gauge bodies may be prepared for firing is to mix finely divided metallic oxides, such as aluminum oxide, thoroughly with finely-divided ceramic fluxes, while both are in a dry state and combining the mixture uniformly with an organic binder such as dextrine or wax, also being in dry or nearly dry condition. This mixture of finely divided materials is then compressed in dry or nearly dry condition in a flexible rubber mold, or by any other mold device which allows uniform application of pressure to the dry powders, until a self-sustaining body is formed which will be substantially in a chalk condition, having a small percentage of moisture included. The mold may in general have a shape, having a rough approximation of the unfired oversize gauge body, the blank being thereafter further shaped by the same process described above with the other methods disclosed.

Another alternate process is to place the raw materials into a ball mill and grind them to fineness without the use of a liquid medium. The resulting powder may then be pressed together while dry, or plasticized by mixture with liquids and/or organic binders. Instead of filter-pressing, evaporation, sedimentation or spray drying may be employed. Instead of pugging and extruding of the blank, an organic binder such as artificial resins can be employed. The blank is then formed by hot pressing the material such as in molding synthetic resins formed by the condensation of phenols and formaldehyde. The firing and the final diamond grinding of these bodies are substantially the same as before.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. The method of making a synthetic ceramic gauge comprising binding together into a blank a mixture of finely divided particles of aluminum oxide having a high temperature of fusion and a hardness over Moh's scale 8 with small amounts of finely divided ceramic fluxes, shaping the blank to a predetermined contour and oversize to allow for shrinkage during firing and a small amount of extra material, firing the shaped blank at a temperature of at least 1500° C. but below the temperature of the fusion of the aluminum oxide producing thereby a body comprising particles of aluminum oxide bonded together by a glassy matrix, and removing by grinding the extra material to form a gauge having a gauging surface of a predetermined final size consisting predominantly of particles of aluminum oxide.

2. The method of making a synethetic ceramic gauge comprising mixing finely divided particles of alumina having a high temperature of fusion and a hardness over Moh's scale 8 with a small percentage by weight of finely divided ceramic fluxes, adding a binder to said mixture to form a cohesive ceramic batch, shaping the batch into a blank having a predetermined contour and oversize to compensate for shrinkage during firing and a small amount of extra material, firing the shaped blank at a temperature of at least 1500° C. but below the temperature of fusion of the alumina to produce thereby a body comprising particles of alumina bonded together by a glassy matrix, and removing by abrasion the extra material to form a gauge having a measuring surface of predetermined final size consisting predominantly of finely divided particles of alumina.

3. The method of making a gauge comprising binding together into a blank a mixture of finely divided metallic oxides selected for their high temperatures of fusion and a hardness over Moh's scale 8 with small amounts of finely divided ceramic fluxes, forming the blank to predetermined oversize to allow for shrinkage during firing and a small amount of extra material for grinding, firing the formed blank at a temperature of at least 1500° C. but below the temperature of fusion of the oxides, and removing the extra material by grinding to form a gauging surface of particles of metallic oxide bonded together by a glassy matrix.

4. The method of making a plug gauge comprising forming an unfired body of a large percentage of finely divided metallic oxide having a high temperature of fusion and a hardness over Moh's scale 8, and a small percentage of finely divided ceramic flux, providing the unfired body with centers along an axis of the body, contouring the unfired body a predetermined oversize to compensate for shrinkage during firing, firing the body at a temperature over 1500° C. but below the fusion temperature of the oxide to vitrify the body into an abrasion-resistant, hard, tough body consisting of the particles of the metallic oxide held in a glassy matrix and grinding the body to predetermined size about said centers.

5. The method of making a gauge from finely divided metallic oxide particles having a hardness over Moh's scale 8 and high temperatures of fusion, comprising forming a body of the oxide particles cemented together by having the interstices filled with a glassy material and grinding the body to desired dimension whereby a gauging surface is formed consisting substantially of ground particles of the metallic oxide.

ROBERT TWELLS.

REFERENCES CITED

The following references are of record in the file of this patent:

UNITED STATES PATENTS

| Number | Name | Date |
| --- | --- | --- |
| 1,131,463 | Berry | Mar. 9, 1915 |
| 1,171,205 | Jeffery et al. | Feb. 8, 1916 |
| 1,491,079 | Champion | Apr. 22, 1924 |
| 2,195,950 | Wood | Apr. 2, 1940 |
| 2,196,258 | Erdle | Apr. 9, 1940 |
| 2,272,618 | Fessler et al. | Feb. 10, 1942 |
| 2,303,304 | Schleicher et al. | Nov. 24, 1942 |
| 2,305,877 | Klinger et al. | Dec. 22, 1942 |
| 2,308,115 | Schwartzwalder et al. | Jan. 12, 1943 |
| 2,346,620 | Skipper | Apr. 11, 1944 |
| 2,351,029 | Feichter | June 13, 1944 |

OTHER REFERENCES

Grits and Grinds, C. S. Reasby, page 1 ("glass plug gauges") May 1943, No. 5, vol. 34, published by Norton Co., Worcester, Mass., class 51, subclass 283.